INVENTORS
PRESTON ROBINSON &
ALFRED SOMMER

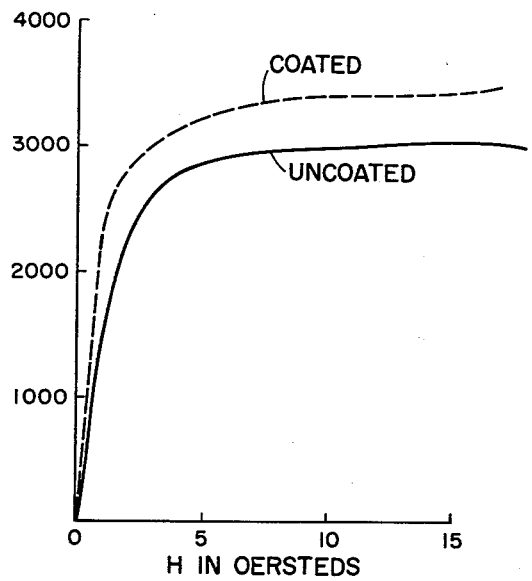
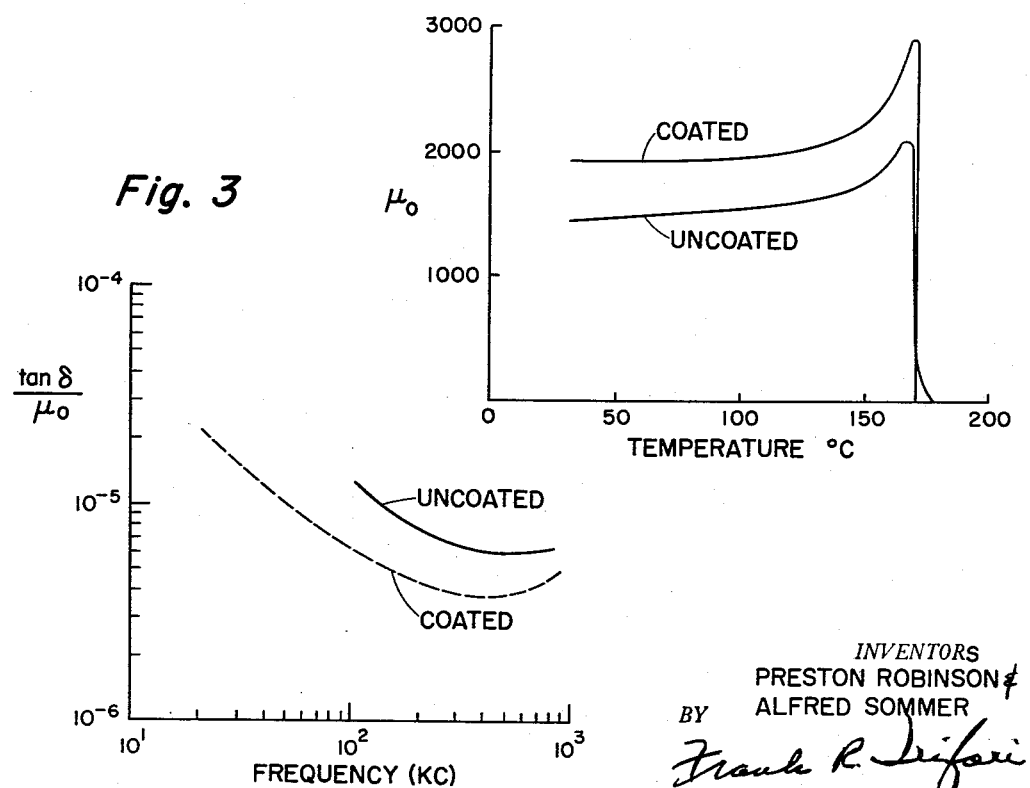

United States Patent Office 3,002,930
Patented Oct. 3, 1961

3,002,930
PROCESS OF MAKING A FERROMAGNETIC BODY
Preston Robinson, Williamstown, Mass., and Alfred Sommer, Kingston, N.Y., assignors to North American Philips Company, Inc., New York, N.Y., a corporation of Delaware
Filed Dec. 3, 1956, Ser. No. 625,872
11 Claims. (Cl. 252—62.5)

Our invention relates to the manufacture of ferromagnetic bodies and in particular, to a process of making a ferrite.

A ferrite is a compound containing iron, oxygen and a divalent metal and corresponds to the formula $MFe_2O_4$ in which M represents one or more divalent metals such as Cu, Mg, Mn, Co, Ni, Zn and the like. Certain ferrites are known to be highly ferromagnetic, i.e. they have magnetic permeabilities of several hundred or more. Since they are non-metallic, they have high resistivities and consequently are extremely useful at higher frequencies where their losses are small compared with ferromagnetic metals.

In general ferrites may be prepared by mixing one or more oxides of the divalent metals and ferric oxide and sintering the mixture, usually after being compacted, at a relatively high temperature, e.g. 900° C. to 1500° C. During sintering the oxides react and form the ferrite.

Since some of the divalent metal oxides are oxygen-sensitive, i.e. they absorb or split off oxygen rather readily at higher temperatures, it is essential to sinter in protective atmospheres. This effect is particularly noticeable in those ferrites containing manganese. Since manganese exists in several valence states, at higher temperatures manganous oxide (MnO) readily absorbs oxygen and forms a higher oxide, e.g. $Mn_3O_4$, which does not form a ferrite. Consequently, in the manufacture of manganese ferrities it is customary to carry out the sintering treatment in a protective atmosphere such as nitrogen. Since commercially available sources of nitrogen still contain small amounts of oxygen, water-vapor or carbon dioxide, some oxygen is still available in the atmosphere and is believed essential. In fact, recent investigations confirm the belief that the oxygen content of the atmosphere plays a significant role in the preparation of the manganese containing ferrites.

Atmospheric control, particularly in high-temperature continuous-kiln furnaces presents a difficult problem and it has been found that manganese-containing ferrites made in such furnaces have a non-magnetic outer layer which must be removed in order to realize the desirable magnetic properties of the body. Moreover, due to the difficulty in regulating the oxygen content of the atmosphere in the furnace, it is difficult, if not impossible, to obtain reproducible characteristics.

An object of this invention is to obviate the need for atmospheric control in the preparation of ferromagnetic ferrites.

A further object of this invention is to improve the magnetic properties of a ferromagnetic ferrite body.

Yet another object of this invention is to improve the reproducibility of ferrites made by firing in high temperature ovens.

A still further object of this invention is to obviate the need for a protective atmosphere in the manufacture of a ferromagnetic ferrite containing manganese.

Those and other objects of this invention will appear as the specification progresses.

Quite unexpectedly, we have found that if a ferromagnetic ferrite body or a molded body of constituents which when fired form a ferrite is coated with a layer of an oxide of a divalent metal, preferably one which has two or more valence states and refired, the properties of the body are greatly improved. While we do not know precisely what occurs when the body is refired, and do not wish to be bound by any theory which explains what occurs, it is probable that the divalent oxide restores the oxygen balance in the ferrite, possibly by diffusion of oxygen into the ferrite or absorption of oxygen by this surface layer. This effect is most startling in the manganese-containing ferrites where we have found unexpectedly a marked improvement in the magnetic permeability.

Thus, the method according to our invention comprises the application of a layer of a divalent metal oxide to a mass of "ferrite-forming constituents" to improve the properties of the body after firing. The term "ferrite-forming constituents" includes the oxides or compounds of divalent metals forming oxides upon heating which when heated to elevated temperatures form ferrites, as well as partially, or fully reacted mixtures of such oxides.

The oxide of the divalent metal is preferably applied to the prefired ferrite in the form of a suspension of finely-divided particles of the oxides in a lacquer. In a preferred embodiment of the invention, we employ finely-divided particles of nickel oxide, e.g. about one micron in diameter suspended in a lacquer such as a cellulose nitrate or cellulose acetate lacquer, into which the prefired ferrite body is immersed, or else the lacquer sprayed on the body. Other divalent metal oxides could be used, for example cobalt oxide, zinc oxide, or copper oxide. Further, we may use substances which form these oxides at lower temperatures than is used in firing the ferrite body such as the metals themselves or the carbonates of the metals. However, particularly beneficial results are obtained with nickel oxide.

After the layer of divalent metal oxide has been applied to the prefired ferrite body, the body is refired at about 1100° C. to 1500° C. A noticeable improvement in the properties of the body is noticed after refiring. Cracks in the prefired body have disappeared; the body appears to have become more dense and to have a shiny appearance. Magnetically, particularly in the case of manganese-zinc ferrities, there is a marked increase in the initial permeability ($\mu_0$). The loss coefficient $\tan \delta (=R/\omega L$, R being the loss resistance measured on a toroid after disregarding the ohmic resistance of a coil wound on the core, L the inductance of the coil, and $\omega$ the angular frequency)—this factor is, in effect, the reciprocal of the Q of the core—is smaller than for a comparable untreated core. Similarly, the quotient, $\tan \delta/\mu_0$ is significantly smaller for a treated core than a comparable untreated core. The improvements in various types of ferrite bodies is conveniently tabulated in a table following the examples.

The invention will be described in connection with the accompanying drawing in which:

FIG. 2 is a graph showing magnetization curves of comparable cores, one of which is made in accordance with the invention, the other not;

FIG. 3 is a graph showing the relationship of $\tan \delta/\mu_0$ with reference for the same cores as in FIG. 2; and FIG. 4 is a graph showing the relationship of initial permeability with temperature for a similar set of cores.

Figure 1:
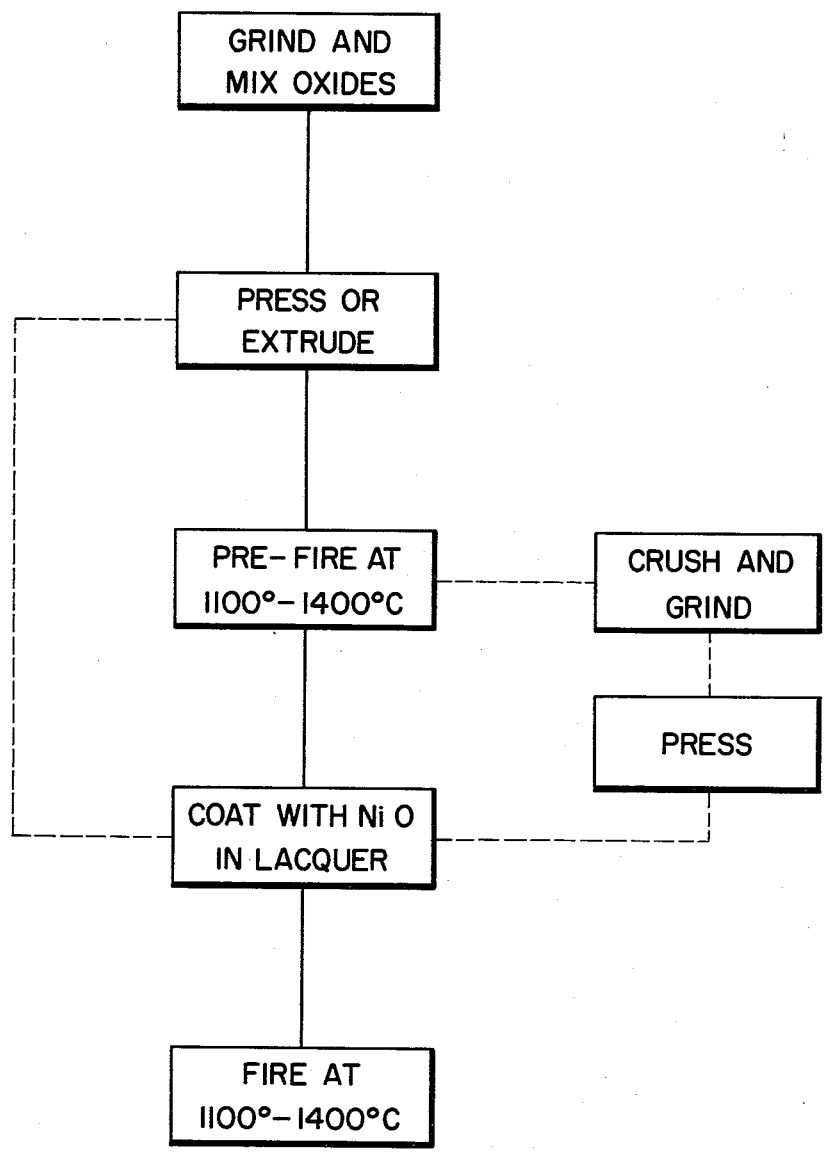
FIG. 1 is a chart showing schematically the process for making cores according to the invention.

The preferred ferrite body is made in the customary manner. Referring to FIG. 1, raw oxides, such as MnO or $MnO_2$, MnO, CuO, ZnO and $Fe_2O_3$, or compounds which upon heating form these oxides, such as, carbonates or nitrates, are first mixed in the desired proportions and ground to a very fine state of sub-division, preferably in an iron ball-mill or similar grinding device. This finely ground, intimately mixed mass of powders is then pressed or extruded, with or without binders, into a body, and the body, fired at a temperature of about 1000° C. to 1400° C. for several hours. During this firing, the particles react and form the ferrite. Depending upon the composition, the body is fired in strongly oxidizing atmospheres, e.g. oxygen, or in nitrogen. Similarly, depending upon the magnetic characteristics and upon the composition, the body may be annealed by slowly cooling it in the furnace during which some of the oxygen lost in sintering is apparently reabsorbed, or rapidly cooled by removing it from the furnace and subjecting it to an air quench.

In some cases, it may be desirable to crush the body and subject the crushed mass to a fine-grinding operation, followed by pressing and refiring in order to improve the product. It is usually at this stage, or after the body has been fully fired, that we apply the coating of divalent oxide to improve the characteristics of the body. It is also possible to apply the divalent oxide coating to the pressed mixture of oxides as shown by the dotted lines in FIG. 1.

The preferred body is then coated with a layer of divalent oxide. For this purpose, we prepared a suspension of about 100 gms. of nickel oxide in 120 gms. of lacquer and immersed the prefired core in this suspension. The coated core is then fired at a temperature of about 1300° C. to 1500° C. for several hours and cooled.

In this manner, magnesium-manganese ferrites and copper manganese ferrites—which are made to exhibit a rectangular hysteresis loop and are particularly useful in magnetic memory devices and switching circuits—were made by mixing about 30–40 mol percent of MgO, 15–25 mol percent $MnO_2$ and 40–45 mol percent $FeO_2O_3$, followed by pressing, firing, cooling and coating with nickel oxide when pulsed with 840 milliamperes writing pulses and 460 milliamperes disturbing pulses show a higher read output and a lower disturbed zero output as compared with a similar uncoated core. For the copper-manganese ferrite, about 4–15 mol. percent of CuO, about 40–51 mol. percent of MnO, and about 44–50 mol. percent of $Fe_2O_3$ were mixed together. For example, a core made in this manner from about 32.5 mol percent MgO, 25.0 mol percent $MnO_2$ and 42.5 mol percent $Fe_2O_3$ had a disturbed zero output of 0.040 volt, down from 0.055 volt for an uncoated core of the same composition, and an undisturbed pulse of 0.095 volt, up from 0.085 volt for the uncoated core. A corresponding copper-manganese ferrite core was made from about 4.4 mol percent of CuO, about 51.2 mol percent MnO and about 44.4 mol percent $Fe_2O_3$.

Similarly, manganese-zinc ferrites were made by mixing about 27–32 mol percent of $MnO_2$, about 16 to 20 mol percent ZnO and about 50–55 mol percent, pressing the mixture, firing in air at about 1100° C. to 1400° C. After cooling, the prefired body was coated with a layer of nickel oxide suspended in a lacquer and refired. The resulting bodies had higher initial permeabilities, lower losses, were free from cracks and appeared denser.

FIGS. 2, 3, and 4, show respectively, the magnetization curves of two cores of the same composition, one coated and the other uncoated, the loss curves, and the relationship of initial permeability with temperatures (hereinafter referred to as the Curie curve).

The cores were made by mixing and finely-grinding about 30 mol percent $MnO_2$, about 18 mol percent of ZnO, and 52 mol percent of $Fe_2O_3$, pressing this mixture into a body at 4 tons/in.$^2$, and firing the bodies in air at 1340° C. for several hours. One of the bodies was thereafter coated with nickel oxide by immersing the body in a suspension of nickel oxide in lacquer and refired at 1365° C. for 2 hours. The magnetization curve shows that the coated body has a steeper slope below the knee of the curve and a higher saturation value than the uncoated body. FIG. 3 shows that the losses for the uncoated body are substantially higher between 100 and 1000 kc./sec. for an uncoated body. FIG. 4, the Curie curve, shows that the initial permeability of the coated body is not only higher than for the uncoated body, but that it is more uniform over the same temperature range. The Curie point, i.e. the temperature at which the body becomes, for all practical purposes, paramagnetic, is approximately the same in both cases.

The following table also shows a comparison of the electromagnetic characteristics of a coated body (a) and an uncoated body (b).

Table "A"

| $\mu_0$ at 25° C. | Q | k.c./sec. frequency | Flux Density, Gauss | Disaccomation, percent | Curie Temp., ° C. | Temp. Coeff. of $\mu_0$ at 30° C. | Flux density v. Temp. | |
|---|---|---|---|---|---|---|---|---|
| (a) 1,956 | 35<br>55<br>65<br>95<br>85 | 25<br>40<br>50<br>100<br>200 | 3,200 | 1.25 | 165 | 1.277×10$^{-2}$ | 3,200<br>3,100<br>2,700<br>1,500 | ° C.<br>30<br>50<br>100<br>150 |
| (b) 1,477 | 30<br>50<br>70<br>90<br>85 | 25<br>40<br>50<br>100<br>200 | 3,000 | 5.50 | 165 | 1.5×10$^{-2}$ | 3,000<br>2,800<br>2,400<br>1,300 | 30<br>50<br>100<br>150 |

These examples are to be considered illustrative only. Thus, we have made a nickel-zinc ferrite core and coated the same with nickel oxide and improved its Q. We have also coated manganese-zinc ferrite cores with copper oxide and with cobalt oxide and have doubled the resistivity of such cores.

It is apparent therefore that other divalent oxide or divalent oxide forming materials may be used and we do not wish to be limited to nickel oxide or to the specific ferrite compositions disclosed in our examples.

What we claim is:

1. A method of making a ferromagnetic body comprising the steps, forming a body of intimately-mixed finely-divided oxides of at least one metal selected from the group consisting of copper, magnesium, manganese, cobalt, zinc and nickel, and ferric oxide in proportions forming upon heating a ferrite having the composition $MFe_2O_4$ in which M is at least one of said metals, applying around said body a layer of a finely-divided oxide of a second metal selected from the group consisting of nickel, cobalt, zinc and copper, and heating the so-coated body to a temperautre of about 1100° to 1500° C. in a non-reducing atmosphere to form said ferrite.

2. A method of making a ferromagnetic body comprising the steps, mixing an oxide of at least one metal selected from the group consisting of copper, magnesium, manganese, cobalt, zinc and nickel, and ferric oxide in proportions forming upon heating a ferrite having the composition $MFe_2O_4$ in which M is at least one of said metals, heating the mixture to a temperature of about 900° to 1500° C. to form said ferrite, forming a body of said ferrite, applying a coating around said body of a finely-divided oxide of a metal selected from the group consisting of nickel, zinc, copper and cobalt, and heating the thus-coated body to a temperature of about 1300° to 1500° C. in a non-reducing atmosphere.

3. A process of making a ferromagnetic body comprising the steps, mixing an oxide of at least one metal selected from the group consisting of copper, magnesium, manganese, cobalt, zinc and nickel and ferric oxide in proportions forming upon heating a ferrite having the composition $MFe_2O_4$ in which M is one of said metals, heating the mixture to a temperature of about 900° to 1500° C. to form said ferrite, forming a body of said ferrite, immersing said body in a suspension of finely-divided nickel oxide in a lacquer to form a coating of nickel oxide around the body, and heating the thus-coated body at a temperature of about 1100° to 1500° C. in a non-reducing atmosphere.

4. A method as defined in claim 1 in which M is manganese.

5. A method as defined in claim 1 in which M is manganese and zinc.

6. A method as defined in claim 1 in which M is manganese and magnesium.

7. A method as defined in claim 1 in which M is manganese and copper.

8. A method as defined in claim 1 in which the second metal is nickel.

9. A method as defined in claim 5 in which the second metal is nickel.

10. A ferromagnetic material obtained by heating at a temperature of about 1100 to 1500° C. in a non-reducing atmosphere a ferrite having the composition $MFe_2O_4$ in which M is at least one metal selected from the group consisting of copper, magnesium, manganese, cobalt, zinc and nickel coated with a layer of a finely-divided oxide of a metal selected from the group consisting of nickel, cobalt, copper and zinc.

11. A ferromagnetic material as defined in claim 10 in which M is manganese and zinc, and the coating is nickel oxide.

References Cited in the file of this patent
UNITED STATES PATENTS

| | | |
|---|---|---|
| 1,976,230 | Kato et al. | Oct. 9, 1934 |
| 2,100,537 | Conway | Nov. 30, 1937 |
| 2,323,169 | Wegenhals | June 29, 1943 |
| 2,565,861 | Leverenz et al. | Aug. 28, 1951 |
| 2,568,881 | Albers-Schoenberg | Sept. 25, 1951 |
| 2,579,978 | Snoek et al. | Dec. 25, 1951 |
| 2,656,319 | Berge | Oct. 20, 1953 |
| 2,700,023 | Albers-Schoenberg | Jan. 18, 1955 |
| 2,723,239 | Harvey | Nov. 8, 1955 |
| 2,860,105 | Gorter et al. | Nov. 11, 1958 |
| 2,886,530 | Greger | May 12, 1959 |
| 2,904,875 | Trigg et al. | Sept. 22, 1959 |

FOREIGN PATENTS

| | | |
|---|---|---|
| 729,538 | Great Britain | May 4, 1955 |
| 735,375 | Great Britain | Aug. 17, 1955 |
| 739,134 | Great Britain | Oct. 26, 1955 |
| 760,799 | Great Britain | Nov. 7, 1956 |
| 1,100,865 | France | Apr. 13, 1955 |

OTHER REFERENCES

Harvey et al.: RCA Review, September 1950, pp. 346, 352.

UNITED STATES PATENT OFFICE
CERTIFICATE OF CORRECTION

Patent No. 3,002,930                            October 3, 1961

Preston Robinson et al.

It is hereby certified that error appears in the above numbered patent requiring correction and that the said Letters Patent should read as corrected below.

Column 2, line 64, for "preferred" read -- prefired --; column 3, line 50, for "$FeO_2O_3$" read -- $Fe_2O_3$ --.

Signed and sealed this 15th day of May 1962.

(SEAL)
Attest:

ERNEST W. SWIDER                                    DAVID L. LADD
Attesting Officer                                       Commissioner of Patents